(12) United States Patent
Kitamura et al.

(10) Patent No.: US 10,377,905 B2
(45) Date of Patent: *Aug. 13, 2019

(54) SLURRY FOR THERMAL SPRAYING, THERMAL SPRAYED COATING, AND METHOD FOR FORMING THERMAL SPRAYED COATING

(71) Applicant: FUJIMI INCORPORATED, Kiyosu-shi, Aichi (JP)

(72) Inventors: Junya Kitamura, Kiyosu (JP); Hiroaki Mizuno, Kiyosu (JP); Kazuto Sato, Kiyosu (JP); Kazuyuki Tsuzuki, Kiyosu (JP)

(73) Assignee: FUJIMI INCORPORATED, Kiyosu-Shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/773,863

(22) PCT Filed: Mar. 7, 2014

(86) PCT No.: PCT/JP2014/055935
§ 371 (c)(1),
(2) Date: Sep. 9, 2015

(87) PCT Pub. No.: WO2014/142018
PCT Pub. Date: Sep. 18, 2014

(65) Prior Publication Data
US 2016/0040278 A1 Feb. 11, 2016

(30) Foreign Application Priority Data
Mar. 13, 2013 (JP) .................. 2013-050862

(51) Int. Cl.
*C23C 4/10* (2016.01)
*C04B 35/505* (2006.01)
*C09D 1/00* (2006.01)
*C23C 4/11* (2016.01)
*C08K 3/34* (2006.01)
*C23C 4/12* (2016.01)
*C04B 35/111* (2006.01)
*C04B 35/18* (2006.01)
*C04B 35/486* (2006.01)

(52) U.S. Cl.
CPC .............. *C09D 1/00* (2013.01); *C04B 35/111* (2013.01); *C04B 35/18* (2013.01); *C04B 35/486* (2013.01); *C04B 35/505* (2013.01); *C08K 3/346* (2013.01); *C23C 4/105* (2013.01); *C23C 4/11* (2016.01); *C23C 4/124* (2013.01); *C23C 4/127* (2013.01); *C04B 2235/3201* (2013.01); *C04B 2235/3208* (2013.01); *C04B 2235/3224* (2013.01); *C04B 2235/3225* (2013.01); *C04B 2235/3227* (2013.01); *C04B 2235/3409* (2013.01); *C04B 2235/42* (2013.01); *C04B 2235/445* (2013.01)

(58) Field of Classification Search
CPC ..... C04B 35/10; C04B 35/111; C04B 35/117; C04B 35/119; C04B 35/50; C04B 35/505; C23C 4/10; C23C 4/11; C23C 4/129; C23C 4/134
See application file for complete search history.

(56) References Cited

U.S. PATENT DOCUMENTS

| 4,450,184 | A | | 5/1984 | Longo et al. |
| 4,741,838 | A | * | 5/1988 | Sharpe, Jr. ............. C02F 1/54 106/487 |
| 4,755,492 | A | * | 7/1988 | Greskovich ........... C04B 35/505 264/1.22 |
| 5,433,901 | A | * | 7/1995 | Rancoule ............ C23C 14/3414 204/298.13 |
| 6,469,226 | B1 | * | 10/2002 | Chica Lara .............. B01J 29/04 208/120.01 |
| 7,115,832 | B1 | | 10/2006 | Blankenship et al. |
| 7,250,080 | B1 | | 7/2007 | Craig et al. |
| 10,196,729 | B2 | * | 2/2019 | Ibe ......................... C23C 4/129 |
| 2002/0160189 | A1 | | 10/2002 | Wataya et al. |
| 2003/0136467 | A1 | | 7/2003 | Hiratsu et al. |
| 2004/0197580 | A1 | | 10/2004 | Dorfman et al. |
| 2004/0221516 | A1 | | 11/2004 | Cho et al. |

(Continued)

FOREIGN PATENT DOCUMENTS

| EP | 1 652 953 A1 | 5/2006 |
| EP | 2 868 766 A1 | 5/2015 |

(Continued)

OTHER PUBLICATIONS

Machine translation of JP 2011168456, Sep. 2011. (Year: 2011).*
Kitamura et al.: US Office Action on U.S. Appl. No. 14/773,874 dated Apr. 3, 2017.
U.S. Appl. No. 14/773,874, filed Sep. 9, 2015, Kitamura et al.

(Continued)

*Primary Examiner* — Karl E Group
(74) *Attorney, Agent, or Firm* — Foley & Lardner LLP

(57) ABSTRACT

A thermal spray slurry of the present invention contains ceramic particles having an average particle size of 200 nm or more and 5 μm or less. Precipitates formed when 700 mL of the thermal spray slurry is placed in a 16.5-cm-high cylindrical vessel having a volume of 1 L and is allowed to stand still at room temperature for 1 week are made to disappear by disposing, at a temperature of 20° C. or higher and 30° C. or lower, the cylindrical vessel so as for the central axis of the cylindrical vessel to be horizontal and by rotating the cylindrical vessel at a rotation speed of 100 rpm for 120 minutes around the central axis of the cylindrical vessel to stir the thermal spray slurry in the cylindrical vessel.

16 Claims, No Drawings

(56) References Cited

U.S. PATENT DOCUMENTS

| | | |
|---|---|---|
| 2006/0091119 A1 | 5/2006 | Zajchowski et al. |
| 2006/0093748 A1 | 5/2006 | Zajchowski et al. |
| 2006/0110320 A1 | 5/2006 | Aoki et al. |
| 2006/0121068 A1 | 6/2006 | Sane et al. |
| 2006/0151321 A1 | 7/2006 | Itoh et al. |
| 2007/0023402 A1 | 2/2007 | Zajchowski et al. |
| 2007/0087129 A1 | 4/2007 | Blankenship et al. |
| 2007/0094936 A1 | 5/2007 | Cho et al. |
| 2009/0208662 A1 | 8/2009 | Blankenship et al. |
| 2009/0314202 A1 | 12/2009 | Zajchowski et al. |
| 2010/0199494 A1 | 8/2010 | Zajchowski et al. |
| 2010/0330282 A1 | 12/2010 | Nienburg et al. |
| 2011/0086178 A1* | 4/2011 | Ruud .................. C23C 4/11 427/447 |
| 2011/0123431 A1 | 5/2011 | Toma et al. |
| 2011/0237421 A1 | 9/2011 | Burgess et al. |
| 2013/0040801 A1* | 2/2013 | Schrems ............... C01F 7/46 501/153 |
| 2013/0068729 A1 | 3/2013 | Zajchowski et al. |
| 2013/0098879 A1 | 4/2013 | Zajchowski et al. |
| 2014/0178641 A1 | 6/2014 | Leblanc et al. |
| 2015/0096462 A1 | 4/2015 | Fukagawa et al. |
| 2015/0307715 A1 | 10/2015 | Sato et al. |
| 2015/0321964 A1* | 11/2015 | Sun .................... C04B 35/10 428/143 |
| 2016/0024328 A1* | 1/2016 | Kitamura ............. C23C 4/11 106/287.17 |
| 2017/0088930 A1 | 3/2017 | Ibe et al. |
| 2017/0283933 A1 | 10/2017 | Ibe et al. |

FOREIGN PATENT DOCUMENTS

| | | | |
|---|---|---|---|
| JP | S58-151474 A | | 9/1983 |
| JP | S60-149403 A | | 8/1985 |
| JP | 02097459 | * | 4/1990 |
| JP | 02097459 A | * | 4/1990 |
| JP | H08-104969 A | | 4/1996 |
| JP | H10-088311 A | | 4/1998 |
| JP | 10-298732 A | | 11/1998 |
| JP | 2002-080954 A | | 3/2002 |
| JP | 2004-331852 A | | 11/2004 |
| JP | 2006-131997 A | | 5/2006 |
| JP | 2006-144094 A | | 6/2006 |
| JP | 3892300 B2 | | 3/2007 |
| JP | 2009-161789 A | | 7/2009 |
| JP | 2010-150617 | * | 7/2010 |
| JP | 2010-150617 A | | 7/2010 |
| JP | 2010-218759 A | | 9/2010 |
| JP | 2011-088037 A | | 5/2011 |
| JP | 2011-522115 A | | 7/2011 |
| JP | 2011-524944 A | | 9/2011 |
| JP | 2011168456 | * | 9/2011 |
| JP | 2014-083110 A | | 5/2014 |
| JP | 2014-240511 A | | 12/2014 |
| WO | WO-97/018341 A1 | | 5/1997 |
| WO | WO-2014-002580 A1 | | 1/2014 |
| WO | WO-2014/142017 A1 | | 9/2014 |
| WO | WO-2015/019673 A1 | | 2/2015 |
| WO | WO-2015-185651 A1 | | 12/2015 |
| WO | WO-2016/043754 A1 | | 3/2016 |

OTHER PUBLICATIONS

Kitamura et al.: US Office Action on U.S. Appl. No. 14/773,874 dated Aug. 25, 2017.

Ibe et al.: U.S. Office Action on U.S. Appl. No. 15/258,131 dated Oct. 12, 2017.

Ibe et al.: U.S. Office Action on U.S. Appl. No. 15/297,464 dated Dec. 6, 2017.

Ibe et al.: U.S. Office Action on U.S. Appl. No. 15/258,131 dated Apr. 24, 2018.

Kitamura et al.: U.S. Office Action on U.S. Appl. No. 14/773,874 dated Mar. 19, 2018.

Final Office Action on U.S. Appl. No. 15/297,464 dated Jul. 23, 2018.

Non-Final Office Action on U.S. Appl. No. 15/258,131 dated Sep. 4, 2018.

Notice of Allowance on U.S. Appl. No. 15/258,118 dated Sep. 19, 2018.

Non Final Office Action dated Oct. 31, 2018 in corresponding U.S. Appl. No. 15/297,464.

Final Office Action on U.S. Appl. No. 15/297,464 dated May 10, 2019 (also included are documents U.S. Pat. No. 10,196,729 and US 2015/0321964-A1 cited in Office Action).

* cited by examiner

SLURRY FOR THERMAL SPRAYING, THERMAL SPRAYED COATING, AND METHOD FOR FORMING THERMAL SPRAYED COATING

TECHNICAL FIELD

The present invention relates to a thermal spray slurry containing ceramic particles, a thermal spray coating formed by using the thermal spray slurry, and a method for forming the thermal spray coating.

BACKGROUND ART

Ceramic thermal spray coatings are used in various applications according to the properties of the constituent ceramics. For example, aluminum oxide thermal spray coatings are used as protective coatings for various members because aluminum oxide exhibits high electric insulation, abrasion resistance, and corrosion resistance. Yttrium oxide thermal spray coatings are used as protective coatings for members in semiconductor device production apparatuses because yttrium oxide exhibits high plasma erosion resistance (see, for example, patent document 1 and patent document 2).

A ceramic thermal spray coating can be formed by thermally spraying a slurry containing ceramic particles (see, for example, patent document 3). However, during the storage of the slurry, the ceramic particles in the slurry are sedimented by gravity and thus precipitates of the ceramic particles are sometimes produced. The precipitated ceramic particles are required to be redispersed before the thermal spraying of the slurry, and hence a slurry tending to produce precipitates is likely to be regarded as unsuitable for practical applications.

PRIOR ART DOCUMENTS

Patent Documents

Patent document 1: Japanese Laid-Open Patent Publication No. 2002-80954
Patent document 2: Japanese Laid-Open Patent Publication No. 2006-144094
Patent document 3: Japanese Laid-Open Patent Publication No. 2010-150617

SUMMARY OF THE INVENTION

Problems that are to be Solved by the Invention

The inventors of the present invention made a diligent study, and have consequently discovered that even a thermal spray slurry tending to produce precipitates is sufficiently usable in practical applications when precipitates can be made to disappear under specific conditions. The present invention has been achieved on the basis of such findings. In other words, an objective of the present invention is to provide a thermal spray slurry in which precipitates produced by the sedimentation of ceramic particles exhibit sufficient redispersibility for practical applications. Another objective of the present invention is to provide a thermal spray coating formed by using the thermal spray slurry and a method for forming the thermal spray coating.

Means for Solving the Problem

In order to achieve the above-described objective and in accordance with an aspect of the present invention, a thermal spray slurry is provided that contains ceramic particles having an average particle size of 200 nm or more and 5 µm or less, wherein precipitates formed when 700 mL of the thermal spray slurry is placed in a 16.5-cm-high cylindrical vessel having a volume of 1 L and is allowed to stand still at room temperature for 1 week are made to disappear by disposing, at a temperature of 20° C. or higher and 30° C. or lower, the cylindrical vessel so as for the central axis of the cylindrical vessel to be horizontal and by rotating the cylindrical vessel at a rotation speed of 100 rpm for 120 minutes around the central axis of the cylindrical vessel to stir the thermal spray slurry in the cylindrical vessel.

The thermal spray slurry may further contain a flocculant.

In accordance with another aspect of the present invention, a thermal spray coating is provided that is obtained by thermally spraying the thermal spray slurry according to the above-described aspect.

In accordance with yet another aspect of the present invention, a method for forming a thermal spray coating is provide, wherein the thermal spray coating is formed by high velocity flame spraying of the thermal spray slurry according to the above-described aspect, containing water as a dispersion medium.

In accordance with still yet another aspect of the present invention, a method for forming a thermal spray coating is provided, wherein the thermal spray coating is formed by plasma spraying of the thermal spray slurry according to the above-described aspect, containing an organic solvent as a dispersion medium.

In the method of the above-described aspect, the thermal spray slurry may be fed to a thermal spraying apparatus by an axial feeding method. Alternatively, the thermal spray slurry may be fed to the thermal spraying apparatus by using two feeders in such a way that the variation period of the feed rate of the thermal spray slurry from one of the feeders is opposite in phase to that from the other feeder. Alternatively, the thermal spray slurry delivered from a feeder is temporarily stored in a tank immediately before reaching the thermal spraying apparatus, and the slurry in the tank may be fed to the thermal spraying apparatus by utilizing free fall of the thermal spray slurry. Alternatively, the thermal spray slurry may be fed to the thermal spraying apparatus through an electrically conductive tube. During the thermal spraying, the thermal spray slurry may be heated to a temperature of preferably 110% or more of the melting point of the ceramic particles.

MODES FOR CARRYING OUT THE INVENTION

Hereinafter, embodiments of the present invention are described.

A thermal spray slurry is used, for example, to form a thermal spray coating. When the thermal spray slurry is thermally sprayed to a substrate, a thermal spray coating is formed on the substrate. With respect to the type of the substrate, it does not particularly matter whether the substrate is made of a metal, a ceramic, or any other material.

The thermal spray slurry is prepared by mixing ceramic particles in a dispersion medium, such as water and an organic solvent. The mixing may be performed by using a blade type stirrer, a homogenizer, or a mixer.

Examples of the organic solvent usable as the dispersion medium include alcohols, such as methanol, ethanol, n-propyl alcohol, and isopropyl alcohol, toluene, hexane, and kerosene. It is preferable to appropriately select the type of the dispersion medium used according to the thermal spraying method of the thermal spray slurry. Specifically, when the thermal spray slurry is thermally sprayed by high velocity flame spraying, it is preferable to use, as the dispersion medium, water, an organic solvent, or a mixture composed of water and an organic solvent. When the thermal spray slurry is plasma sprayed, it is preferable to use an organic solvent as a dispersion medium; however, it is also possible to use water or a mixture composed of water and an organic solvent in place of the organic solvent.

The ceramic particles contained in the thermal spray slurry may be particles made of an oxide ceramic, such as yttrium oxide, aluminum oxide, silicon oxide, titanium oxide, zirconium oxide, yttria-stabilized zirconium oxide, chromium oxide, zinc oxide, mullite, yttrium aluminum garnet (YAG), cordierite, and zircon. Alternatively, the ceramic particles may be particles made of a spinel ceramic; an oxide ceramic containing a rare earth element, such as scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu); or a double oxide ceramic, containing aluminum (Al), silicon (Si), manganese (Mn), zinc (Zn), calcium (Ca), sodium (Na), phosphorus (P), fluorine (F), or boron (B). Alternatively, the ceramic particles may be particles made of a carbide ceramic, such as boron carbide.

The average particle size of the ceramic particles used is 200 nm or more and preferably 500 nm or more, and is 5 μm or less and preferably 4 μm or less. Since the particle size is thus relatively larger, the ceramic particles are easily sedimented by gravity in the thermal spray slurry to form precipitates. Accordingly, an operation such as stirring for redispersing the precipitated ceramic particles is required at the time of using the thermal spray slurry.

However, precipitates formed when 700 mL of the thermal spray slurry is placed in a 16.5-cm-high cylindrical vessel having a volume of 1 L and is allowed to stand still at room temperature for 1 week are made to disappear by disposing, at a temperature of 20° C. or higher and 30° C. or lower, the cylindrical vessel so as for the central axis of the cylindrical vessel to be horizontal and by rotating the cylindrical vessel at a rotation speed of 100 rpm for 120 minutes, more preferably for 100 minutes, around the central axis of the cylindrical vessel to stir the thermal spray slurry in the cylindrical vessel. The verification of the disappearance of the precipitates can be performed by visually observing the thermal spray slurry after stirring. Thus, the thermal spray slurry has a sufficient practical value even when precipitates are formed.

The content of the ceramic particles in the thermal spray slurry, namely, the solid content concentration of the slurry is preferably 10% by mass or more, more preferably 20% by mass or more, and furthermore preferably 30% by mass or more. In this case, it is easy to improve the thickness of the thermal spray coating produced per unit time from the thermal spray slurry, namely, the thermal spraying efficiency.

The content of the ceramic particles in the thermal spray slurry is also preferably 85% by mass or less, more preferably 70% by mass or less, and furthermore preferably 50% by mass or less. In this case, it is easy to obtain a thermal spray slurry having a required fluidity appropriate for satisfactory feeding to a thermal spraying apparatus, namely, a thermal spray slurry having a fluidity sufficient for forming a thermal spray coating.

The sedimentation velocity of the ceramic particles in the thermal spray slurry is preferably 1 μm/sec or more and more preferably 5 μm/sec or more. The sedimentation velocity can be used as an index for indicating the ease of sedimentation of the ceramic particles in the thermal spray slurry.

The viscosity of the thermal spray slurry is preferably 3,000 mPa·s or less, more preferably 1,000 mPa·s or less, furthermore preferably 500 mPa·s or less, and most preferably 100 mPa·s or less. With the decrease of the viscosity, it becomes easy to obtain a thermal spray slurry having a required fluidity sufficient for forming a thermal spray coating.

The thermal spray slurry may further contain a flocculant, if necessary. The flocculant as referred to herein means a compound capable of flocculating the ceramic particles in the thermal spray slurry. When a flocculant is contained in the thermal spray slurry, precipitates of the ceramic particles are formed in a state such that the flocculant is interposed between the ceramic particles, and hence the redispersibility of the precipitated ceramic particles is improved. Specifically, the precipitated ceramic particles are easily redispersed by an operation such as stirring, and hence the operation for the redispersion becomes simple. The flocculant may be any of an aluminum flocculant, an iron flocculant, a polymer flocculant, and an organic compound flocculant. Examples of the aluminum flocculant include aluminum sulfate (also referred to as alum), aluminum chloride, and polyaluminum chloride (also referred to as PAC or PACl). Examples of the iron flocculant include ferric chloride and polyferric sulfate. Examples of the polymer flocculant include isobutylene-maleic acid copolymer and carboxy vinyl polymer. The polymer flocculant may be any of an anionic polymer flocculant, a cationic polymer flocculant, and a nonionic polymer flocculant. Examples of the organic compound flocculant include organic acids, such as malic acid, succinic acid, citric acid, maleic acid, and maleic anhydride.

The thermal spray slurry may further contain a viscosity modifier, if necessary. The viscosity modifier as referred to herein means a compound capable of decreasing or increasing the viscosity of the thermal spray slurry. By appropriately regulating the viscosity of the thermal spray slurry, the decrease of the fluidity of the thermal spray slurry is suppressed even when the content of the ceramic particles in the thermal spray slurry is relatively high. Examples of the compound usable as the viscosity modifier include nonionic polymers; polyethers, such as polyethylene glycol; and cellulose derivatives, such as carboxymethyl cellulose (CMC) and hydroxyethyl cellulose (HEC).

The thermal spray slurry may further contain a dispersant, if necessary. The dispersant as referred to herein means a compound capable of improving the dispersion stability of the ceramic particles in the thermal spray slurry. The dispersant may be anionic, cationic, or nonionic. Examples of the anionic dispersant include polycarboxylic acid dispersants, such as polycarboxylic acid sodium salt and polycarboxylic acid ammonium salt; naphthalenesulfonic acid dispersants, such as naphthalenesulfonic acid sodium salt and naphthalenesulfonic acid ammonium salt; alkylsulfonic acid dispersants; and polyphosphoric acid dispersants. Examples of the cationic dispersant include polyalkylene polyamine dispersants, quaternary ammonium dispersants, and alkyl polyamine dispersants. Examples of the nonionic dispersant include alkylene oxide dispersants and polyhydric alcohol ester dispersants.

The thermal spray slurry may further contain a defoaming agent, if necessary. The defoaming agent as referred to herein means a compound capable of preventing the formation of bubbles in the thermal spray slurry during the production or the thermal spraying of the thermal spray slurry, or a compound capable of vanishing bubbles formed in the thermal spray slurry. Examples of the defoaming agent include silicone oil, silicone emulsion defoaming agents, polyether defoaming agents, and fatty acid ester defoaming agents.

The thermal spray slurry may further contain an antiseptic or a fungicide, if necessary. Examples of the antiseptic or the fungicide include isothiazoline compounds, azole compounds, and propylene glycol.

When a flocculant, a viscosity modifier, a dispersant, a defoaming agent, an antiseptic, or a fungicide is used, during the preparation of the thermal spray slurry, the flocculant, the viscosity modifier, the dispersant, the defoaming agent, the antiseptic, or the fungicide may be added to the dispersion medium at the same timing as that of the addition of the ceramic particles, or at the timing different from that of the addition of the ceramic particles.

The method for thermally spraying the thermal spray slurry may be a high velocity flame spraying method, in which the thermal spray slurry is fed into the center of the high velocity combustion flame jet flow generated with high-pressure oxygen (or air) and a fuel and is continuously jetted at a high velocity, such as a high velocity oxygen fuel spraying method (HVOF). Alternatively, the method may be a plasma spraying method, in which the thermal spray slurry is fed into the center of the plasma jet flow generated from the gas in a plasma form and is jetted, such as an atmospheric-pressure plasma spraying method (APS). When the thermal spray slurry of the present invention is thermally sprayed by the high velocity flame spraying method or the plasma spraying method, the thermal spray slurry, high in the content of ceramic particles, can be thermally sprayed with a satisfactory fluidity, and a dense thermal spray coating can be formed efficiently.

When the thermal spray slurry contains water as the dispersion medium, it is preferable to use the high velocity flame spraying method. When the dispersion medium contained in the thermal spray slurry is an organic solvent, it is preferable to use the plasma spraying method. The fuel used in the high velocity flame spraying method may be a hydrocarbon gas fuel, such as acetylene, ethylene, propane, and propylene, or a liquid fuel, such as kerosene and ethanol.

The thermal spray slurry is heated during thermal spraying to a temperature of preferably 110% or more of the melting point of the ceramic particles. In this case, the ceramic particles are sufficiently heated during thermal spraying, and hence it becomes easy to obtain a dense thermal spray coating.

The thermal spraying distance, namely, the distance from the tip of the nozzle of the thermal spraying apparatus to the substrate is preferably 30 mm or more. In this case, it becomes easy to suppress thermal alteration or thermal deformation of the substrate.

The thermal spraying distance is also preferably 200 mm or less. In this case, the ceramic particles are sufficiently heated during thermal spraying, and hence it becomes easy to obtain a dense thermal spray coating.

It is preferable to perform the feeding of the thermal spray slurry to the thermal spraying apparatus by the axial feeding method, namely, to perform the feeding of the thermal spray slurry in the same direction as the axis of the jet flow generated in the thermal spraying apparatus. When the thermal spray slurry of the present invention is fed to the thermal spraying apparatus by the axial feeding method, attachment of the ceramic particles in the thermal spray slurry is less likely to occur inside the thermal spraying apparatus since the thermal spray slurry has good fluidity, and thus a dense thermal spray coating can be formed efficiently.

When the thermal spray slurry is fed to the thermal spraying apparatus by using a common feeder, a periodic variation of the feed rate occurs, and hence stable feeding of the slurry is difficult. The periodic variation of the feed rate is also referred to as pulsation. When the pulsation increases the feed rate of the thermal spray powder, the ceramic particles are less likely to be uniformly heated in the thermal spraying apparatus, and a nonuniform thermal spray coating is sometimes formed. Accordingly, in order to stably feed the thermal spray slurry to the thermal spraying apparatus, a two-stroke method may be adopted, namely, two feeders may be used in such a way that the variation period of the feed rate of the thermal spray slurry from one of the feeders is opposite in phase to that from the other feeder. Specifically, the feeding method may be regulated so as to have a period such that when the feed rate from one feeder is increased, the feed rate from the other feeder is decreased. When the thermal spray powder of the present invention is fed to the thermal spraying apparatus by the two-stroke method, a dense thermal spray coating can be formed efficiently since the thermal spray powder has good fluidity.

Means for stably feeding the thermal spray slurry to the thermal spraying apparatus are as follows. That is, a tank may be provided in which the thermal spray slurry delivered from the feeder is temporarily stored immediately before the slurry reaches the thermal spraying apparatus, and the thermal spray slurry in the tank may be fed to the thermal spraying apparatus by utilizing free fall of the slurry. Alternatively, the thermal spray slurry in the tank may be fed to the thermal spraying apparatus in a forcible manner by using a device such as a pump. When the slurry is fed in a forcible manner by using a device such as a pump, even in the case where the tank and the thermal spraying apparatus are connected with each other through a tube, attachment of the ceramic particles in the thermal spray slurry is less likely to occur inside the tube. In order to make uniform the distribution of the components in the thermal spray slurry stored in the tank, a device for stirring the thermal spray slurry in the tank may be provided.

The feeding of the thermal spray slurry to the thermal spraying apparatus is performed preferably through an electrically conductive tube made of, for example, a metal. When an electrically conductive tube is used, the occurrence of static electricity is suppressed, and hence the variation of the feed rate of the thermal spray slurry is less likely to occur. The inner surface of the electrically conductive tube has a surface roughness Ra of preferably 0.2 µm or less.

(Operation)

Since the average particle size of the ceramic particles in the thermal spray slurry is relatively as large as 200 nm or more and 5 µm or less, the ceramic particles are easily sedimented by gravity in the thermal spray slurry to form precipitates. However, precipitates formed when 700 mL of the thermal spray slurry is placed in a 16.5-cm-high cylindrical vessel having a volume of 1 L and is allowed to stand still at room temperature for 1 week are made to disappear by disposing, at a temperature of 20° C. or higher and 30° C. or lower, the cylindrical vessel so as for the central axis of the cylindrical vessel to be horizontal and by rotating the cylindrical vessel at a rotation speed of 100 rpm for 120 minutes around the central axis of the cylindrical vessel to stir the thermal spray slurry in the cylindrical vessel. The thermal spray slurry is sufficiently usable in practical applications because the precipitates can be made to disappear under such specific conditions.

(Advantageous Effects)

Accordingly, according to the present embodiments, a thermal spray slurry is provided in which precipitates formed by the sedimentation of ceramic particles exhibit a sufficient redispersibility for practical applications.

(Modifications)

The above-described embodiments may be modified as follows.

The ceramic particles in the thermal spray slurry may contain a component or components other than ceramics.

The thermal spray slurry may contain two or more types of ceramic particles.

The thermal spray slurry may contain two or more types of flocculants.

The thermal spray slurry may contain two or more types of viscosity modifiers.

The thermal spray slurry may contain two or more types of dispersants.

The thermal spray slurry may contain two or more types of defoaming agents.

The thermal spray slurry may contain two or more types of antiseptics.

The thermal spray slurry may contain two or more types of fungicides.

The thermal spray slurry may contain two or more of a flocculant, a viscosity modifier, a dispersant, a defoaming agent, an antiseptic, and a fungicide.

The thermal spray slurry may further contain a component or components other than a flocculant, a viscosity modifier, a dispersant, a defoaming agent, an antiseptic, and a fungicide.

The components other than the dispersion medium in the thermal spray slurry are prepared as contained in one or more packages other than the package for the dispersion medium, and the thermal spray slurry may be prepared by mixing the components other than the dispersion medium with the dispersion medium. In this case, the thermal spray slurry can be simply prepared even immediately before thermal spraying.

EXAMPLES

Next, the present invention is described more specifically with reference to examples and comparative examples.

In each of Examples 1 to 15 and Comparative Examples 1 to 4, a thermal spray slurry was prepared by mixing ceramic particles with a dispersion medium, and by further mixing with the resulting mixture a flocculant or a viscosity modifier, if necessary. The details of each of the thermal spray slurries are shown in Table 1.

TABLE 1

| | Dispersion medium | Type of ceramic particles | Average particle size of ceramic particles | Content of ceramic particles (% by mass) | Flocculant | Viscosity modifier | Re-dispersibility | Coating property (1) | Coating property (2) |
|---|---|---|---|---|---|---|---|---|---|
| Comparative Example 1 | Water | $Al_2O_3$ | 150 nm | 50 | — | — | x | — | x |
| Example 1 | Ethanol | $Al_2O_3$ | 200 nm | 50 | Maleic anhydride | — | ○ | ○ | ○ |
| Example 2 | Water | $Al_2O_3$ | 200 nm | 50 | Maleic anhydride | — | ○ | — | ○ |
| Example 3 | Water | $Al_2O_3$ | 200 nm | 50 | Aluminum sulfate | — | ○ | — | ○ |
| Example 4 | Ethanol | $Al_2O_3$ | 2 μm | 50 | — | — | ○ | ○ | ○ |
| Example 5 | Ethanol | $Al_2O_3$ | 2 μm | 10 | Maleic anhydride | — | ○ | x | x |
| Comparative Example 2 | Ethanol | $Al_2O_3$ | 2 μm | 95 | Maleic anhydride | — | x | x | x |
| Comparative Example 3 | Ethanol | $Al_2O_3$ | 2 μm | 95 | Maleic anhydride | — | x | x | x |
| Example 6 | Ethanol | $Al_2O_3$ | 4 μm | 50 | — | PEG | ○ | ○ | ○ |
| Example 7 | Ethanol | $Y_2O_3$ | 4 μm | 50 | — | PEG | ○ | ○ | ○ |
| Example 8 | Ethanol | YSZ | 4 μm | 50 | — | PEG | ○ | ○ | ○ |
| Example 9 | Mixture of water and ethanol | $Al_2O_3$ | 4 μm | 50 | — | PEG | ○ | ○ | ○ |
| Comparative Example 4 | Ethanol | $Al_2O_3$ | 10 μm | 50 | — | — | ○ | x | x |
| Example 10 | Water | $Y_2O_3$ | 1.6 μm | 50 | Carboxy vinyl polymer | — | ○○ | — | ○ |
| Example 11 | Mixture of ethanol, isopropyl alcohol and normal propyl alcohol | $Y_2O_3$ | 1.6 μm | 50 | Carboxy vinyl polymer | — | ○○ | ○ | ○ |
| Example 12 | Water | (La—Yb—Al—Si—Zn)O | 1.6 μm | 50 | Carboxy vinyl polymer | — | ○○ | ○ | ○ |
| Example 13 | Mixture of ethanol, isopropyl alcohol and normal | (La—Yb—Al—Si—Zn)O | 1.6 μm | 50 | Carboxy vinyl polymer | — | ○○ | ○ | ○ |

TABLE 1-continued

| | Dispersion medium | Type of ceramic particles | Average particle size of ceramic particles | Content of ceramic particles (% by mass) | Flocculant | Viscosity modifier | Re-dispersibility | Coating property (1) | Coating property (2) |
|---|---|---|---|---|---|---|---|---|---|
| Example 14 | propyl alcohol Water | (La—Al—Si—Ca—Na—P—F—B)O | 4.8 μm | 50 | Carboxy vinyl polymer | — | ∘∘ | ∘ | ∘ |
| Example 15 | Mixture of ethanol, isopropyl alcohol and normal propyl alcohol | (La—Al—Si—Ca—Na—P—F—B)O | 4.8 μm | 50 | Carboxy vinyl polymer | — | ∘∘ | ∘ | ∘ |

The column "Dispersion medium" in Table 1 shows the type of the dispersion medium used in each of the thermal spray slurries.

The column "Type of ceramic particles" in Table 1 shows the type of the ceramic particles used in each of the thermal spray slurries. In the same column, "$Al_2O_3$" represents aluminum oxide, "$Y_2O_3$" represents yttrium oxide, "YSZ" represents yttria-stabilized zirconium oxide, "(La—Yb—Al—Si—Zn)O" represents a double oxide ceramic containing lanthanum, ytterbium, aluminum, silicon, and zinc, and "(La—Al—Si—Ca—Na—P—F—B)O" represents a double oxide ceramic containing lanthanum, aluminum, silicon, calcium, sodium, phosphorus, fluorine, and boron.

The column "Average particle size of ceramic particles" in Table 1 shows the average particle size of the ceramic particles used in each of the thermal spray slurries. The average particle size was calculated from the specific surface areas of the ceramic particles measured by using the specific surface area measurement apparatus "Flow Sorb II 2300", manufactured by Micromeritics Corp.

The column "Content of ceramic particles" in Table 1 shows the content of the ceramic particles in each of the thermal spray slurries.

The column "Flocculant" in Table 1 shows the type of the flocculant used in each of the thermal spray slurries. In the same column, the hyphen (-) indicates no use of a flocculant. When a flocculant was used, the flocculant was used in an amount to give a content of 2% by mass of the flocculant in the thermal spray slurry.

The column "Viscosity modifier" in Table 1 shows the type of the viscosity modifier used in each of the thermal spray slurries. In the same column, "PEG" represents polyethylene glycol, and the hyphen (-) indicates no use of a viscosity modifier. When a viscosity modifier was used, the viscosity modifier was used in an amount to give a content of 2% by mass of the viscosity modifier in the thermal spray slurry.

The column "Redispersibility" in Table 1 shows the result of evaluating whether or not precipitates formed when 700 mL of each of the thermal spray slurries was placed in a 16.5-cm-high cylindrical vessel having a volume of 1 L and was allowed to stand still at room temperature for 1 week were made to disappear by disposing, at a temperature of 20° C. or higher and 30° C. or lower, the cylindrical vessel so as for the central axis of the cylindrical vessel to be horizontal and by rotating the cylindrical vessel at a rotation speed of 100 rpm around the central axis of the cylindrical vessel to stir the thermal spray slurry in the cylindrical vessel. In the same column, "∘∘ (excellent)" represents the disappearance of the precipitates within 60 minutes, "∘ (good)" represents the disappearance of the precipitates within a range exceeding 60 minutes and being 120 minutes or less, and "× (poor)" represents no disappearance of the precipitates within 120 minutes.

The column "Coating property (1)" in Table 1 shows the result of evaluating the porosity of the thermal spray coating obtained by atmospheric plasma spraying of each of the thermal spray slurries under the conditions described in Table 2. The measurement of the porosity was performed as follows. Specifically, the cross section of a thermal spray coating was polished with the coating resin-embedded, and then the cross-sectional image was photographed by using the digital microscope VC-7700, manufactured by OMRON Corp. Subsequently, by the image analysis with the image analysis software ImagePro, produced by Nippon Roper K.K., the pore areas were identified in the cross-sectional image, and the proportion of the pore areas in the cross-sectional image was determined. In the column "Coating property (1)", "∘ (good)" indicates that the measured porosity of the thermal spray coating was 10% or less, "× (poor)" indicates that the measured porosity exceeded 10%, and "-" indicates that no test was performed.

The column "Coating property (2)" in Table 1 shows the result of evaluating the porosity of the thermal spray coating obtained by HVOF spraying of each of the thermal spray slurries under the conditions described in Table 3. In the same column, "∘ (good)" indicates that the porosity of the thermal spray coating measured by the same method as described above was 10% or less, and "× (poor)" indicates that the porosity of the thermal spray coating measured by the same method as described above exceeded 10%.

TABLE 2

Thermal spraying apparatus: "Axial III", manufactured by Northwest Mettech Corp.
Slurry feeder: "M650", manufactured by Northwest Mettech Corp.
Ar gas flow rate: 81 L/min
Nitrogen gas flow rate: 81 L/min
Hydrogen gas flow rate: 18 L/min
Plasma power: 88 kW
Thermal spraying distance: 50 mm
Traveling speed of thermal spraying apparatus: 240 m/min
Feed rate of thermal spray slurry: 3 L/hour

TABLE 3

Thermal spraying apparatus: "Top gun", manufactured by GTV GmbH
Slurry feeder: Manufactured by GTV GmbH
Acetylene gas flow rate: 75 L/min
Oxygen gas flow rate: 230 L/min
Thermal spraying distance: 90 mm
Traveling speed of thermal spraying apparatus: 100 m/min
Feed rate of thermal spray slurry: 4.5 L/hour As shown in Table 1, in the case of the thermal spray slurry of each of Examples 1 to 15, the evaluation result regarding the redispersibility was excellent or good. The thermal spray coating obtained from the thermal spray slurry of each of Examples 1 to 4 and 6 to 15 was high in the degree of denseness in such a way that the porosity was 10% or less.

The invention claimed is:

1. A thermal spray slurry comprising a flocculant and ceramic particles having an average particle size of 200 nm or more and 5 μm or less, the ceramic particles consist of yttrium oxide and contained in the thermal spray slurry in an amount of 50% by mass or less,
    wherein precipitates formed when 700 mL of the thermal spray slurry is placed in a 16.5-cm-high cylindrical vessel having a volume of 1 L and a central axis and is allowed to stand still at room temperature for 1 week are made to disappear by disposing, at a temperature of 20° C. or higher and 30° C. or lower, the cylindrical vessel so as for the central axis of the cylindrical vessel to be horizontal and by rotating the cylindrical vessel at a rotation speed of 100 rpm for 120 minutes around the central axis of the cylindrical vessel to stir the thermal spray slurry in the cylindrical vessel.

2. A method for forming a thermal spray coating, comprising high velocity flame spraying the thermal spray slurry according to claim 1, containing water as a dispersion medium, to form a thermal spray coating.

3. A method for forming a thermal spray coating, comprising plasma spraying the thermal spray slurry according to claim 1, containing an organic solvent as a dispersion medium, to form a thermal spray coating.

4. The method for forming a thermal spray coating according to claim 2, further comprising feeding the thermal spray slurry to a thermal spraying apparatus by an axial feeding method.

5. The method for forming a thermal spray coating according to claim 2, further comprising feeding the thermal spray slurry to a thermal spraying apparatus by using two feeders in such a way that the variation period of the feed rate of the thermal spray slurry from one of the feeders is opposite in phase to that from the other feeder.

6. The method for forming a thermal spray coating according to claim 2, further comprising:
    temporarily storing the thermal spray slurry delivered from a feeder in a tank immediately before reaching a thermal spraying apparatus; and
    feeding the thermal spray slurry in the tank to the thermal spraying apparatus by utilizing free fall of the thermal spray slurry.

7. The method for forming a thermal spray coating according to claim 2, further comprising feeding the thermal spray slurry to a thermal spraying apparatus through an electrically conductive tube.

8. The method for forming a thermal spray coating according to claim 2, further comprising heating, during said spraying, the thermal spray slurry to a temperature of 110% or more of the melting point of the ceramic particles.

9. The method for forming a thermal spray coating according to claim 3, further comprising feeding the thermal spray slurry to a thermal spraying apparatus by an axial feeding method.

10. The method for forming a thermal spray coating according to claim 3, further comprising feeding the thermal spray slurry to a thermal spraying apparatus by using two feeders in such a way that the variation period of the feed rate of the thermal spray slurry from one of the feeders is opposite in phase to that from the other feeder.

11. The method for forming a thermal spray coating according to claim 3, further comprising:
    temporarily storing the thermal spray slurry delivered from a feeder in a tank immediately before reaching a thermal spraying apparatus; and
    feeding the thermal spray slurry in the tank to the thermal spraying apparatus by utilizing free fall of the thermal spray slurry.

12. The method for forming a thermal spray coating according to claim 3, further comprising feeding the thermal spray slurry to a thermal spraying apparatus through an electrically conductive tube.

13. The method for forming a thermal spray coating according to claim 3, further comprising heating, during said spraying, the thermal spray slurry to a temperature of 110% or more of the melting point of the ceramic particles.

14. The thermal spray slurry according to claim 1, wherein the flocculant is maleic anhydride.

15. The thermal spray slurry according to claim 1, wherein the flocculant is aluminum sulfate.

16. The thermal spray slurry according to claim 1, wherein the flocculant is carboxy vinyl polymer.

* * * * *